J. E. DORMAN.
SELF ADJUSTING BEARING.
APPLICATION FILED JAN. 8, 1917.
1,256,530.
Patented Feb. 19, 1918.
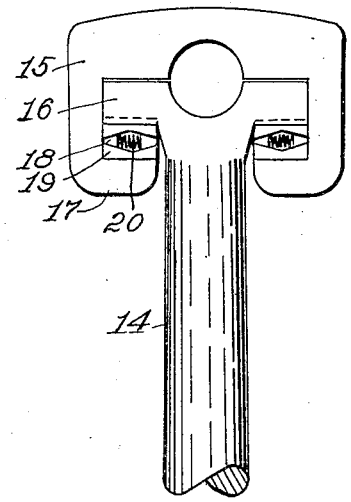
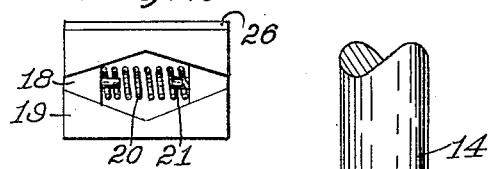
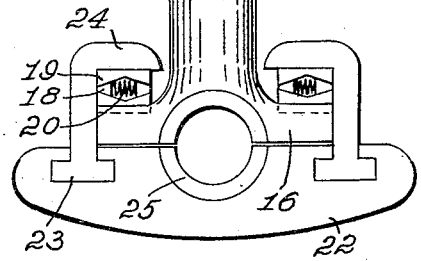
Inventor,
Jack E. Dorman, by
G. C. Kennedy,
Attorney.

UNITED STATES PATENT OFFICE.

JACK E. DORMAN, OF TOWNSHIP, IOWA.

SELF-ADJUSTING BEARING.

1,256,530. Specification of Letters Patent. Patented Feb. 19, 1918.

Application filed January 8, 1917. Serial No. 141,208.

*To all whom it may concern:*

Be it known that I, JACK E. DORMAN, a citizen of the United States of America, and a resident of Township, Butler county, Iowa, have invented certain new and useful Improvements in Self-Adjusting Bearings, of which the following is a specification.

My invention relates to improvements in self adjusting bearings, and the object of my improvement is to furnish a separable bearing convenient for assembling and disassembling, while having means provided for taking up for wear in its bearing parts subject to friction.

This object I have accomplished by the means which are hereinafter described and claimed, and which are illustrated in the accompanying drawings, in which: Figure 1 is an enlarged detail of the end-bearing of the connecting-rod including my improved take-up means; Fig. 2 is an enlarged view of said take-up means, and Fig. 3 is a view of the other end of the connecting-rod with like take-up means embodied in it.

Similar numerals of reference denote corresponding parts throughout the several views.

Figures 1 and 3 represent bearings on opposite ends of a connecting-rod 14. These bearings are preferably formed of separable parts, provided with means for taking up wear. The end of the rod 14 has one-half of a bearing-opening, and has oppositely-extending branches 16 receivable in rectangular seats of greater width in an inclosing head 15. In the space between each branch 16 and an inwardly-hooked part 17 of the head 15 are placed the cage-blocks 19, spaced apart with outwardly converging interspaces to receive wedge-shaped slides 18. A longitudinal edge of one or more of the blocks 19 has a longitudinal rib 26, receivable in a corresponding longitudinal groove in the head 15 to prevent its escape. Each wedge 18 has a pin 21, one of them hollowed out, to seat a coiled compression-spring 20, bearing against said wedges to force them apart yieldingly, thus causing the wedges to press the blocks 19 apart to keep the bearing parts 15 and 16 together to take up for wear in the bearing.

The opposite end of the connecting-rod 14 has a similar bearing. The rod has like lateral extensions 16 and a head 22, said head and rod-end having bearing-brasses 25 in their bearing-opening for the crank-pin. The head 22 has T-shaped openings adapted to receive like shaped heads 23 on removable clips 24.

Devices such as shown in Fig. 2 and previously described, are inserted in the interspaces of the extensions 16 and the clips 24, to take up wear in the bearing.

The parts of my device are all readily assembled or disassembled for use or for cleaning or repair.

Having described my invention, what I claim as new, and desire to secure by Letters Patent, is:

The combination with separable bearing-parts, one of which is removable, clips detachably mounted on the removable bearing-part, the other bearing-part being included between said clips and the removable bearing-part and spaced from said clips, and resilient adjusting-means co-engaged with and between said clips and said fixed bearing-part and adapted to yieldingly adjustably hold the bearing-parts together to take up wear, said adjusting-means comprising spaced blocks between and contacting with opposed faces of said clips and said other bearing-part, the opposed face of each block having a like reëntrant angle, wedges movably fitted in the end-parts of the reëntrant angles of the interspace of said blocks, and yieldable resilient means engaged between said wedges.

Signed at Greene, Iowa, this 22nd day of December, 1916.

JACK E. DORMAN.

Witnesses:
GEO. BARTH,
G. R. WATTERSON.